J. K. HOYT.
Pencil-Sharpening Guide.
No. 227,012.                              Patented April 27, 1880.
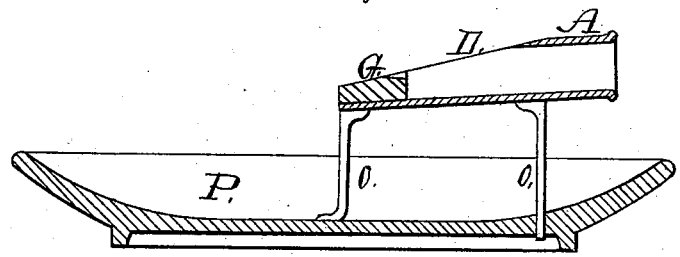

UNITED STATES PATENT OFFICE.

JEHIEL K. HOYT, OF NEWARK, NEW JERSEY.

PENCIL-SHARPENING GUIDE.

SPECIFICATION forming part of Letters Patent No. 227,012, dated April 27, 1880.

Application filed August 25, 1879.

*To all whom it may concern:*

Be it known that I, JEHIEL K. HOYT, of Newark, in the county of Essex and State of New Jersey, have invented a new and useful Improvement in Pencil-Sharpening Guides, of which the following is a specification.

My invention relates to improvements in pencil-sharpening guides wherein the cut of the pencil is with a knife lengthwise of the grain of the wood, and with such an attachment as to support the point of the pencil while under the process of cutting, and to prevent its breaking.

It consists in making a tube to receive the end of the pencil with one side cut away to the exact slope required as the guide of the knife in cutting, and in furnishing the end of the tube with a rest or rest and stop for the point of the pencil, and against which the knife used in sharpening may strike, or over which, when used merely as a rest, the knife may slip, and in uniting this sharpening-guide with a stationary dish, to be used on a table or elsewhere where pencils are in use, or separately, as an attachment to the pencil, as hereinafter set forth.

Figure 1 is a side view of the guide. Fig. 2 is a plan view with a pencil in it and sharpened. Fig. 3 is a modified form, and is attached to a dish.

In my drawings, A is the tube for receiving the end of the pencil B, and has the opening C in one side, to allow of expansion for pencils of different sizes. D is a slope cut away from the tube, leaving the sides as a guide for cutting the taper of the pencil-point.

The end E of the tube is left whole, and in this end is put a stop, F, which extends a short distance into the slope, so that the knife in cutting will strike this stop, made of rubber or some other elastic material, and not come in contact with the metal of the tube to dull it. This stop has a portion, G, extending into the tube one-fourth of an inch, more or less, cut on the upper side to conform to the slope D, for a rest for the point of the pencil.

When the rubber is used for a stop it may be made to extend out from the tube, to be used as a pencil-eraser, H; and this pencil-sharpener guide may be carried on the point end of the pencil, and serve as a point-protector.

This sharpener-guide is connected with supports O, and secured to a suitable dish, P, of iron or other material, to stand on a table or desk, for catching the chips cut from the pencil.

What I claim as my invention, and desire to secure by Letters Patent, is—

1. In pencil-sharpening guides, the tube A, provided with the sloping cut D, in combination with the stop F and eraser H, substantially as and for the purposes specified.

2. The tube A, provided with the cut D, in combination with the stop F, eraser H, and rest G, substantially as and for the purpose set forth.

JEHIEL K. HOYT.

Witnesses:
HORACE HARRIS,
J. J. GHEGAN.